US008869364B2

(12) United States Patent
Jaynes

(10) Patent No.: US 8,869,364 B2
(45) Date of Patent: Oct. 28, 2014

(54) MATERIAL SEPARATING TOOL

(75) Inventor: Robert Jaynes, Mars, PA (US)

(73) Assignee: Aesynt Incorporated, Cranberry, PA (US)

( * ) Notice: Subject to any disclaimer, the term of this patent is extended or adjusted under 35 U.S.C. 154(b) by 39 days.

(21) Appl. No.: 13/532,462

(22) Filed: Jun. 25, 2012

(65) Prior Publication Data

US 2013/0340227 A1 Dec. 26, 2013

(51) Int. Cl.
*B23P 19/04* (2006.01)

(52) U.S. Cl.
USPC ........................ 29/239; 29/244; 269/3; 269/6

(58) Field of Classification Search
USPC ............... 29/239, 238, 244–282; 269/3, 6, 95
See application file for complete search history.

(56) References Cited

U.S. PATENT DOCUMENTS

| | | | |
|---|---|---|---|
| 4,717,042 A | 1/1988 | McLaughlin | |
| 4,785,969 A | 11/1988 | McLaughlin | |
| 4,847,764 A | 7/1989 | Halvorson | |
| 4,936,053 A * | 6/1990 | Shanelec | 451/224 |
| 5,014,875 A | 5/1991 | McLaughlin et al. | |
| 5,190,185 A | 3/1993 | Blechl | |
| 5,314,243 A | 5/1994 | McDonald et al. | |
| 5,346,297 A | 9/1994 | Colson, Jr. et al. | |
| 5,377,864 A | 1/1995 | Blechl et al. | |
| 5,405,048 A | 4/1995 | Rogers et al. | |
| 5,431,299 A | 7/1995 | Brewer et al. | |
| 5,443,347 A | 8/1995 | Weinlader | |
| 5,460,294 A | 10/1995 | Williams | |
| 5,468,110 A | 11/1995 | McDonald et al. | |
| 5,480,062 A | 1/1996 | Rogers et al. | |
| 5,520,450 A | 5/1996 | Colson, Jr. et al. | |
| 5,564,803 A | 10/1996 | McDonald et al. | |
| 5,593,267 A | 1/1997 | McDonald et al. | |
| 5,661,978 A | 9/1997 | Holmes et al. | |
| D384,578 S | 10/1997 | Wangu et al. | |
| 5,713,485 A | 2/1998 | Liff et al. | |
| 5,716,114 A | 2/1998 | Holmes et al. | |
| 5,745,366 A | 4/1998 | Higham et al. | |
| 5,761,877 A | 6/1998 | Quandt | |
| 5,797,515 A | 8/1998 | Liff et al. | |
| 5,805,456 A | 9/1998 | Higham et al. | |
| 5,842,976 A | 12/1998 | Williamson | |
| 5,878,885 A | 3/1999 | Wangu et al. | |
| 5,880,443 A | 3/1999 | McDonald et al. | |

(Continued)

OTHER PUBLICATIONS

"*Automatic Grocery Bag Opener*;" YouTube; retrieved on Aug. 15, 2013 from <http://youtube.com/watch?v=mWVkvhpj7TQ>.

(Continued)

*Primary Examiner* — Lee D Wilson
(74) *Attorney, Agent, or Firm* — Alston & Bird LLP

(57) ABSTRACT

A tool for separating material layers may include a first arm including a first end and a second end; a second arm including a first end and a second end; a first material contact pad carried by the first arm proximate the first end of the first arm; and a second material contact pad carried by the second arm proximate the first end of the second arm. The second end of the first arm may be joined to the second end of the second arm, and the first material contact pad and the second material contact pad may be movable with respect to one another along two substantially orthogonal axes.

16 Claims, 7 Drawing Sheets

(56) References Cited

U.S. PATENT DOCUMENTS

| | | | | | |
|---|---|---|---|---|---|
| 5,883,806 | A | | 3/1999 | Meador et al. | |
| 5,893,697 | A | | 4/1999 | Zini et al. | |
| 5,905,653 | A | | 5/1999 | Higham et al. | |
| 5,912,818 | A | | 6/1999 | McGrady et al. | |
| 5,927,540 | A | | 7/1999 | Godlewski | |
| 5,940,306 | A | | 8/1999 | Gardner et al. | |
| 5,971,593 | A | | 10/1999 | McGrady | |
| 6,003,006 | A | | 12/1999 | Colella et al. | |
| 6,011,999 | A | | 1/2000 | Holmes | |
| 6,021,392 | A | | 2/2000 | Lester et al. | |
| 6,029,964 | A | * | 2/2000 | Bohl | 269/6 |
| 6,039,467 | A | | 3/2000 | Holmes | |
| 6,065,819 | A | | 5/2000 | Holmes et al. | |
| 6,068,156 | A | | 5/2000 | Liff et al. | |
| 6,109,774 | A | | 8/2000 | Holmes et al. | |
| 6,112,502 | A | | 9/2000 | Frederick et al. | |
| 6,116,461 | A | | 9/2000 | Broadfield et al. | |
| 6,151,536 | A | | 11/2000 | Arnold et al. | |
| 6,170,230 | B1 | | 1/2001 | Chudy et al. | |
| 6,176,392 | B1 | | 1/2001 | William et al. | |
| 6,189,727 | B1 | | 2/2001 | Shoenfeld | |
| 6,223,934 | B1 | | 5/2001 | Shoenfeld | |
| 6,256,967 | B1 | | 7/2001 | Hebron et al. | |
| 6,283,322 | B1 | | 9/2001 | Liff et al. | |
| 6,289,656 | B1 | | 9/2001 | Wangu et al. | |
| 6,338,007 | B1 | | 1/2002 | Broadfield et al. | |
| 6,339,732 | B1 | | 1/2002 | Phoon et al. | |
| 6,361,263 | B1 | | 3/2002 | Dewey et al. | |
| 6,370,841 | B1 | | 4/2002 | Chudy et al. | |
| 6,449,927 | B2 | | 9/2002 | Hebron et al. | |
| 6,471,089 | B2 | | 10/2002 | Liff et al. | |
| 6,497,342 | B2 | | 12/2002 | Zhang et al. | |
| 6,499,270 | B2 | | 12/2002 | Peroni et al. | |
| 6,532,399 | B2 | | 3/2003 | Mase | |
| 6,564,121 | B1 | | 5/2003 | Wallace et al. | |
| 6,581,798 | B2 | | 6/2003 | Liff et al. | |
| 6,609,047 | B1 | | 8/2003 | Lipps | |
| 6,611,733 | B1 | | 8/2003 | De La Huerga | |
| 6,625,952 | B1 | | 9/2003 | Chudy et al. | |
| 6,640,159 | B2 | | 10/2003 | Holmes et al. | |
| 6,650,964 | B2 | | 11/2003 | Spano, Jr. et al. | |
| 6,671,579 | B2 | | 12/2003 | Spano, Jr. et al. | |
| 6,681,149 | B2 | | 1/2004 | William et al. | |
| 6,742,671 | B2 | | 6/2004 | Hebron et al. | |
| 6,755,382 | B1 | * | 6/2004 | Melnick | 248/316.8 |
| 6,755,931 | B2 | | 6/2004 | Vollm et al. | |
| 6,760,643 | B2 | | 7/2004 | Lipps | |
| 6,776,304 | B2 | | 8/2004 | Liff et al. | |
| 6,785,589 | B2 | | 8/2004 | Eggenberger et al. | |
| 6,790,198 | B1 | | 9/2004 | White et al. | |
| 6,814,254 | B2 | | 11/2004 | Liff et al. | |
| 6,814,255 | B2 | | 11/2004 | Liff et al. | |
| 6,847,861 | B2 | | 1/2005 | Lunak et al. | |
| 6,874,684 | B1 | | 4/2005 | Denenberg et al. | |
| 6,892,780 | B2 | | 5/2005 | Vollm et al. | |
| 6,895,304 | B2 | | 5/2005 | Spano, Jr. et al. | |
| 6,931,817 | B2 | | 8/2005 | Reed | |
| 6,975,922 | B2 | | 12/2005 | Duncan et al. | |
| 6,985,797 | B2 | | 1/2006 | Spano, Jr. et al. | |
| 6,996,455 | B2 | | 2/2006 | Eggenberger et al. | |
| 7,010,389 | B2 | | 3/2006 | Lunak et al. | |
| 7,014,063 | B2 | | 3/2006 | Shows et al. | |
| 7,016,766 | B2 | | 3/2006 | William et al. | |
| 7,040,504 | B2 | | 5/2006 | Broadfield et al. | |
| 7,052,097 | B2 | | 5/2006 | Meek, Jr. et al. | |
| 7,072,737 | B2 | | 7/2006 | Lunak et al. | |
| 7,072,855 | B1 | | 7/2006 | Godlewski et al. | |
| 7,077,286 | B2 | | 7/2006 | Shows et al. | |
| 7,085,621 | B2 | | 8/2006 | Spano, Jr. et al. | |
| 7,092,796 | B2 | | 8/2006 | Vanderveen | |
| 7,093,755 | B2 | | 8/2006 | Jordan et al. | |
| 7,100,792 | B2 | | 9/2006 | Hunter et al. | |
| 7,103,419 | B2 | | 9/2006 | Engleson et al. | |
| 7,111,780 | B2 | | 9/2006 | Broussard et al. | |
| 7,139,639 | B2 | | 11/2006 | Broussard et al. | |
| 7,150,724 | B2 | | 12/2006 | Morris et al. | |
| 7,171,277 | B2 | | 1/2007 | Engleson et al. | |
| 7,218,231 | B2 | | 5/2007 | Higham | |
| 7,228,198 | B2 | | 6/2007 | Vollm et al. | |
| 7,249,688 | B2 | | 7/2007 | Hunter et al. | |
| 7,334,616 | B2 | * | 2/2008 | Kaminski | 150/147 |
| 7,348,884 | B2 | | 3/2008 | Higham | |
| 7,417,729 | B2 | | 8/2008 | Greenwald | |
| 7,419,133 | B2 | | 9/2008 | Clarke et al. | |
| 7,426,425 | B2 | | 9/2008 | Meek, Jr. et al. | |
| 7,554,449 | B2 | | 6/2009 | Higham | |
| 7,571,024 | B2 | | 8/2009 | Duncan et al. | |
| 7,588,167 | B2 | | 9/2009 | Hunter et al. | |
| 8,047,494 | B2 | * | 11/2011 | Chang | 248/316.1 |
| 2008/0029944 | A1 | * | 2/2008 | Avalani | 269/6 |
| 2013/0340227 | A1 | * | 12/2013 | Jaynes | 29/426.5 |

OTHER PUBLICATIONS

"*Bag Opener with Magnet* (*Pack of 3*);" Amazon; originally retrieved on May 3, 2012 from <http://.amazon.com/Bag-Opener-Magnet-Pack-3/dp/B0052ZU2MO/ref=pd_sim_sbs_k_4>.

"*Fox Run Plastic Bag Opener*;" Google; originally retrieved on May 3, 2012 from <http://.google.com/products/catalog?q=plastic+bag+opener&rlz=1T4ADFA_enUS381US381&safe=active&um=1&ie=UTF-8&tbm=shop&cid=30984908572744363 57#>.

"*Open Smart Bag Opener*;" Amazon; originally retrieved on May 3, 2012 from <http://.amazon.com/Spring-Mill-Home-Products-92-3004/dp/B001G8XSA4/ref=pd_sim_sbs_k_1>.

* cited by examiner

MATERIAL SEPARATING TOOL

TECHNOLOGICAL FIELD

Embodiments of the present invention relate to tools configured to aid the separation of materials held together by static cling, materials previously compressed together, or otherwise maintained in close contact, and more particularly, to a tool configured to separate layers of materials in a safe and repeatable manner.

BACKGROUND

Many products using sheet-stock material, such as paper and plastic, are produced and supplied to customers in bulk quantities for use in environments such as offices, hospitals, grocery stores, etc. Products made from sheet-stock material may include items such as plastic bags and printing/copier paper. These products may be conducive to efficient packaging with little wasted space as the sheets and layers of materials may be tightly packed together; however, separating the layers of materials, whether it's separating sheets of paper, separating plastic bags, or opening plastic bags, may be difficult. The layers of thin, flexible materials of paper sheets and plastic bags may interface with adjacent layers of materials along a substantial surface area resulting in a strong adherence between adjacent layers. This adherence may be caused by static electricity in the form of static cling.

In the case of rolled items, such as thin-film plastic bags, such as those found in many grocery store produce sections, the individual bags may be separated from a roll of plastic bag with relative ease; however, opening the bags may prove difficult as the bag cavity may be difficult to access when the inner sides of the plastic bag cavity may cling together. The perforations that may be created between rolled thin-film plastic bags occur at an opening to the bag cavity and may exacerbate the difficulty in opening the plastic bag as the perforations may inadvertently create a bond between the sides of the plastic bag proximate the opening. It may be desirable to have a tool to aid the separation of layers of materials, such as layers of plastic or paper.

BRIEF SUMMARY

Various embodiments of the present invention are directed to tools configured to aid the separation of layers of materials held together by a force, such as static electricity, and more particularly, to a tool configured to separate the materials in a safe and repeatable manner.

A tool for separating material layers according to one embodiment of the present invention may include a first arm including a first end and a second end; a second arm including a first end and a second end; a first material contact pad carried by the first arm proximate the first end of the first arm; and a second material contact pad carried by the second arm proximate the first end of the second arm. The second end of the first arm may be joined to the second end of the second arm, and the first material contact pad and the second material contact pad may be movable with respect to one another along two substantially orthogonal axes. The first end of the first arm and the first end of the second arm may define a gap there between, and the first material contact pad and the second material contact pad may be disposed within the gap. The first material contact pad and the second material contact pad may include a material that is of a different composition than a material of the first arm or the second arm. The material of the material contact pads may include rubber. The first arm may include a pivot connection disposed between the first end and the second end of the first arm.

According to some embodiments, the first material contact pad may define a material contact surface, where the material contact surface defines a material contact plane, and where the pivot connection is configured to permit rotation of the first material contact pad relative to the second material contact pad within the material contact plane. The pivot connection may include a torsion spring configured to bias the first end of the first arm to a position in which the first material contact pad is facing the second material contact pad. The first arm and the second arm may be joined proximate their respective second ends by a flexible portion. The first material contact pad may define a material contact surface where the material contact surface defines a material contact plane, where a first of the two substantially orthogonal axes is perpendicular to the material contact plane, and wherein a second of the two substantially orthogonal axes is parallel to the material contact plane. The first material contact pad and the second material contact pad may be configured to face one another and motion between the first material contact pad and the second material contact pad may be limited such that at least a portion of the first material contact pad overlies a portion of the second material contact pad.

Embodiments of the present invention may further provide for a tool for separating layers of material including a first material contact surface defining a first material contact plane, a second material contact surface defining a second material contact plane, where the first material contact surface faces the second material contact surface, and where the first material contact surface and the second material contact surface are separated by a gap. A first axis may be defined orthogonal to the first material contact plane and a second axis may be defined parallel to the first material contact plane, where the first material contact surface is connected to the second material contact surface by a body which permits motion between the first material contact surface and the second material contact surface along both the first and second axes.

The first material contact surface and the second material contact surface of embodiments of the present invention may include rubber. The body may include a first arm, a second arm, and a flexible portion connecting the first arm and the second arm. The first material contact surface may be on the first arm and the second material contact surface may be on the second arm. The flexible portion may allow the first material contact surface to move relative to the second material contact surface along the first axis. The first arm may include a pivot connection between the flexible portion and the first material contact surface, where the pivot connection allows the first material contact surface to move relative to the second material contact surface along the second axis. The pivot connection may include a biasing member configured to bias the first material contact surface into alignment with the second material contact surface. The biasing member may include a torsion spring. The flexible portion of the tool may include a material such as polyethylene or polypropylene.

Embodiments of the present invention may provide a method for separating layers of materials. The method may include positioning a first layer of material and a second layer of material between a first material contact pad and a second material contact pad, where the first material contact pad is carried by a first arm and the second material contact pad is carried by a second arm. The method may further include capturing the first material layer and the second material layer in response to pressing together the first material contact pad and the second material contact pad, and pivoting at least a portion of the first arm relative to the second arm in order to pivot one of the material contact pads relative to the other material contact pad. The method may also include moving the first layer of material relative to the second layer of material in response to pivoting at least a portion of the first arm relative to the second arm. Pivoting at least a portion of the first arm relative to the second arm may include pivoting the first arm relative to the second arm against a biasing force. Pressing together the first material contact pad and the second material contact pad may include pressing the first arm toward the second arm.

BRIEF DESCRIPTION OF SEVERAL VIEWS OF THE DRAWING(S)

Reference will now be made to the accompanying drawings, which are not necessarily drawn to scale, and wherein.

DETAILED DESCRIPTION

Figure 1:
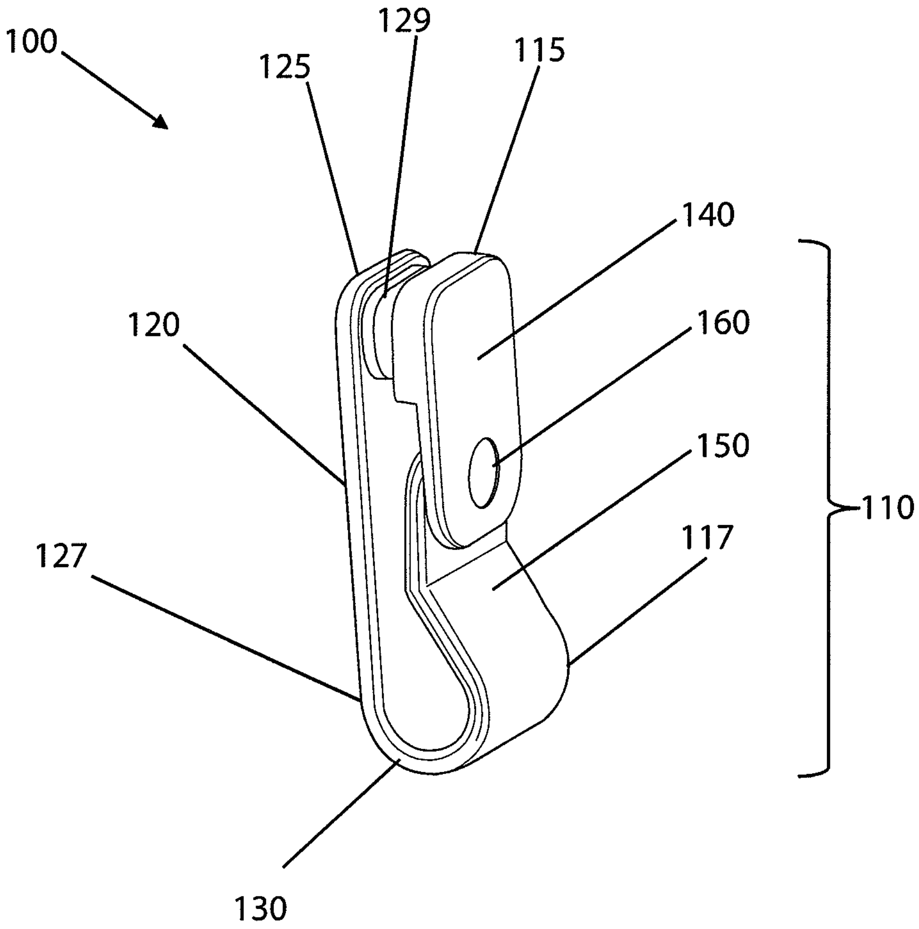
FIG. 1 illustrates a material separating tool according to an example embodiment of the present invention.

The present invention will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. The terms top, bottom, side, up, down, upwards, downwards, vertical, horizontal, and the like as used below do not imply a required limitation in all embodiments of the present invention but rather are used herein to help describe relative direction or orientation in the example embodiments illustrated in the figures.

Various embodiments of the present invention provide a tool for separating layers of material. Materials, such as thin-film plastics and paper, when interfaced with other materials, which may be the same or different, may be difficult to separate. Static electricity within the materials may result in static cling between layers of materials making them difficult to separate from one another. Thin materials lacking structure may be particularly difficult to separate as layers of material may tend to move in concert with one another. Additionally, when the surfaces of these layers of material have a low coefficient of friction, it may be difficult for a user to grip the materials and separate the material layers manually.

Example embodiments of the present invention may be used to separate layers of material, particularly thin materials that may otherwise be difficult to separate from one another. Such embodiments may provide assistance to a user in separating layers of materials when, for example, opening plastic produce bags or plastic bags in a medical environment. Conventional tools to open bags or to separate layers of materials may use air flow or sharp edges; however, these tools have drawbacks. For example, a blower configured to blow open bags or separate layers of material requires a power supply, the blowers tend to be noisy, and the blower would require some form of actuator to determine when to operate if the blower is to not run constantly. Tools that include knives or piercing portions may be inappropriate for applications for which example embodiments of the present invention may be used.

The use of sharp objects that may pierce skin or personal protective equipment (PPE) such as rubber gloves are often forbidden in areas of hospitals or pharmacies where secondary damage or contamination can occur due to an accident. For example, in clean rooms, in which operators may work with cyto-toxic drugs and other hazardous substances, sharp objects may puncture PPE worn by operators exposing the operator to dangerous chemicals and posing safety risks. Thus, sharp edges and tools are discouraged or forbidden. Similarly, sharp objects are discouraged in environments in which children may be present, such as in grocery stores. As such tools without sharp edges or points and tools that don't have the disadvantages of blowers may be beneficial in many environments.

An example embodiment of the present invention is illustrated in FIG. 1 which depicts a tool 100 including a first arm 110 and a second arm 120. The first arm 110 and the second arm 120 each include a first end 115, 125 and a second end 117, 127, opposite the first end. In the illustrated embodiment, the second end of each of the first arm 110 and the second arm 120 are joined by a flexible hinge 130. The flexible hinge of the illustrated embodiment is a flexible, non-rigid connection between the first arm 110 and the second arm 120. The first arm 110, or a portion thereof, the second arm 120, and the flexible hinge 130 may be integrally formed together from the same material, such as a molded plastic (e.g., high density poly-ethylene) or formed from a piece of resilient material such as spring steel.

A material contact pad 129 may be disposed proximate the first end 125 of each of the first arm 110 and the second arm 120. In the illustrated embodiment of FIG. 1, only the material contact pad 129 of the second arm is visible. The material contact pad 129 may define a surface that is a material contact surface. The material contact surface of the material contact pad 129 of the second arm may oppose the material contact surface of the material contact pad of the first arm. The material contact pads may be made of a number of materials including rubber, silicone, or other material that may have a relatively high-friction surface. The composition of the material contact pads may be selected based upon the type of materials that the tool is configured to separate. For example, the composition of the material contact pad may be selected having a coefficient of friction between the material contact pad and the material that is greater than the coefficient of friction between the layers of material. Thus, when the material contact pads are moved relative to one another, the layers of material tend to move with a respective material contact pad rather than stay stationary with respect to each other. Further, the material may be deformable, such as rubber or silicone, to promote greater surface contact between the material contact pad and the material as will be outlined further below.

Figure 2:
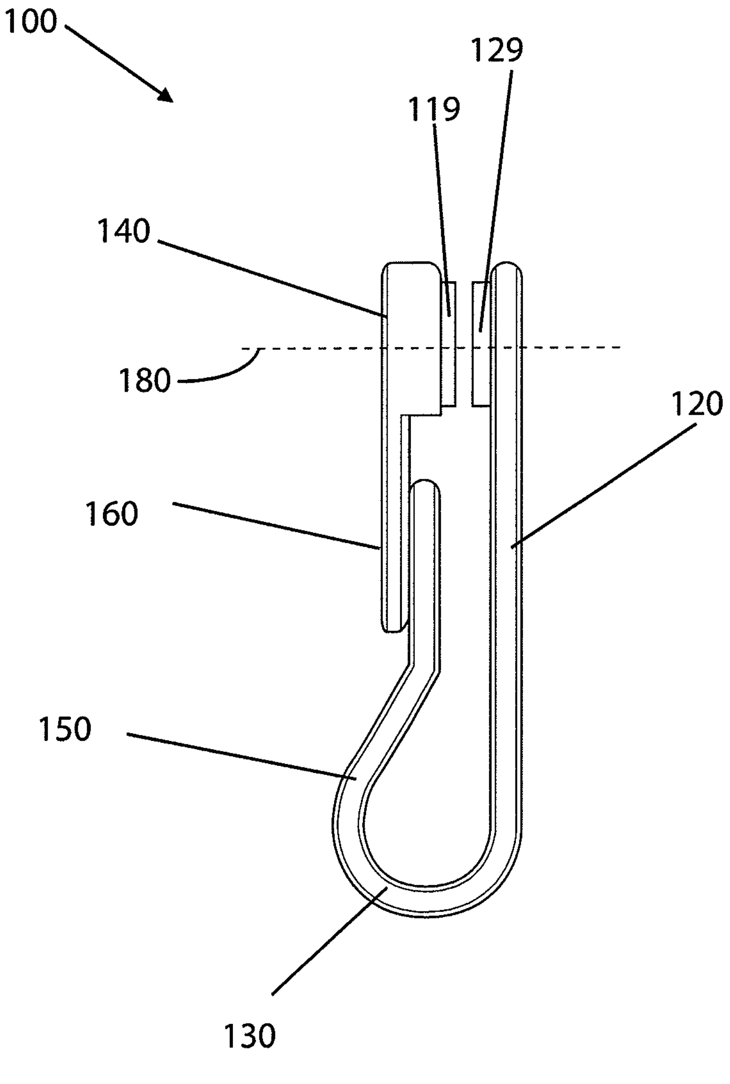
FIG. 2 illustrates a side view of the material separating tool of FIG. 1.

The flexible hinge 130 may be configured to permit relative motion between the first end 115 of the first arm 110 and the first end 125 of the second arm 120. The relative motion may be permitted, in some embodiments, only along an axis that is substantially orthogonal to a plane defined by the material contact surface of the material contact pad 129, such that the flexible hinge 130 permits the material contact pads 125 to be moved toward one another. FIG. 2 illustrates the tool 100 of FIG. 1 as viewed in profile depicting the first arm 110, second arm 120, and the flexible hinge 130. Further depicted are the material contact pads 119, 129 of the first and second arms respectively. Axis 180 is shown to illustrate the axis along which the first arm 110 and second arm 120 are configured to move relative to one another due to the flexible hinge 130.

Figure 3:
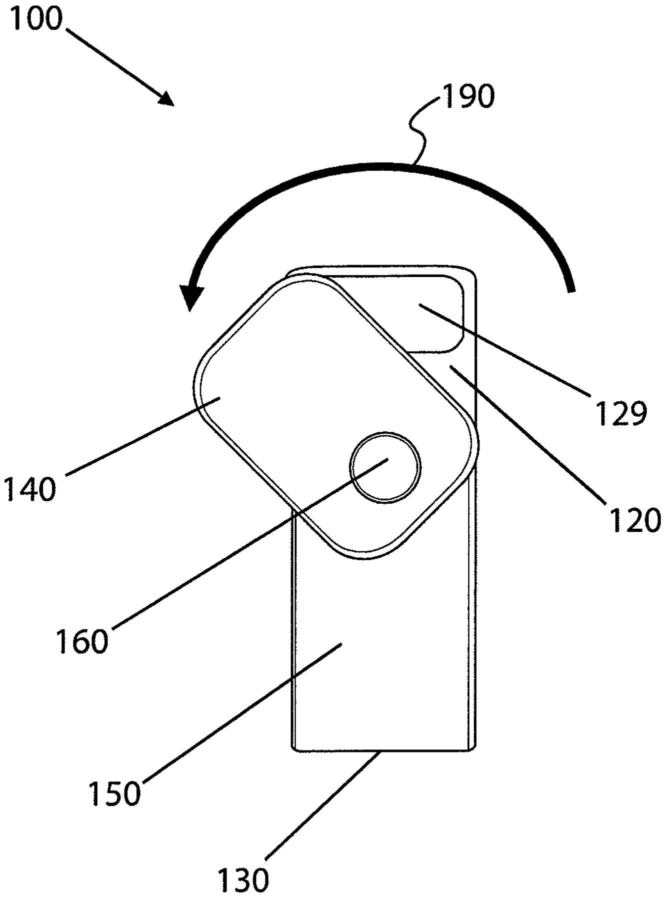
FIG. 3 illustrates a material separating view including a first arm with a pivot point according to an example embodiment of the invention.

While the first arm 110 may be a unitary piece, the illustrated embodiment of FIG. 1 includes a pivot point 160 disposed between the first end 115 of the first arm 110 and the second end 117 of the first arm 110. The pivot point 160 may divide the first arm into a first portion 140 and a second portion 150. The pivot point 160 may be configured to permit the first portion 140 to pivot relative to the second portion 150. The pivot point 160 may allow the first portion 140 of the first arm 110 to pivot about an axis substantially parallel with axis 180 that is substantially orthogonal to the plane defined by the material contact surface of the material contact pad 129. FIG. 3 illustrates the tool 100 of FIGS. 1 and 2 shown with the first portion 140 of the first arm 110 pivoted with respect to the second portion 150 of the first arm 110. The first portion 140 pivots about pivot point 160 along arrow 190. As illustrated, when the first portion 140 of the first arm 110 is pivoted relative to the second portion 150, the material contact pad 119 of the first arm 110 is pivoted out of alignment with the material contact pad 129 of the second arm 120.

Figure 4:
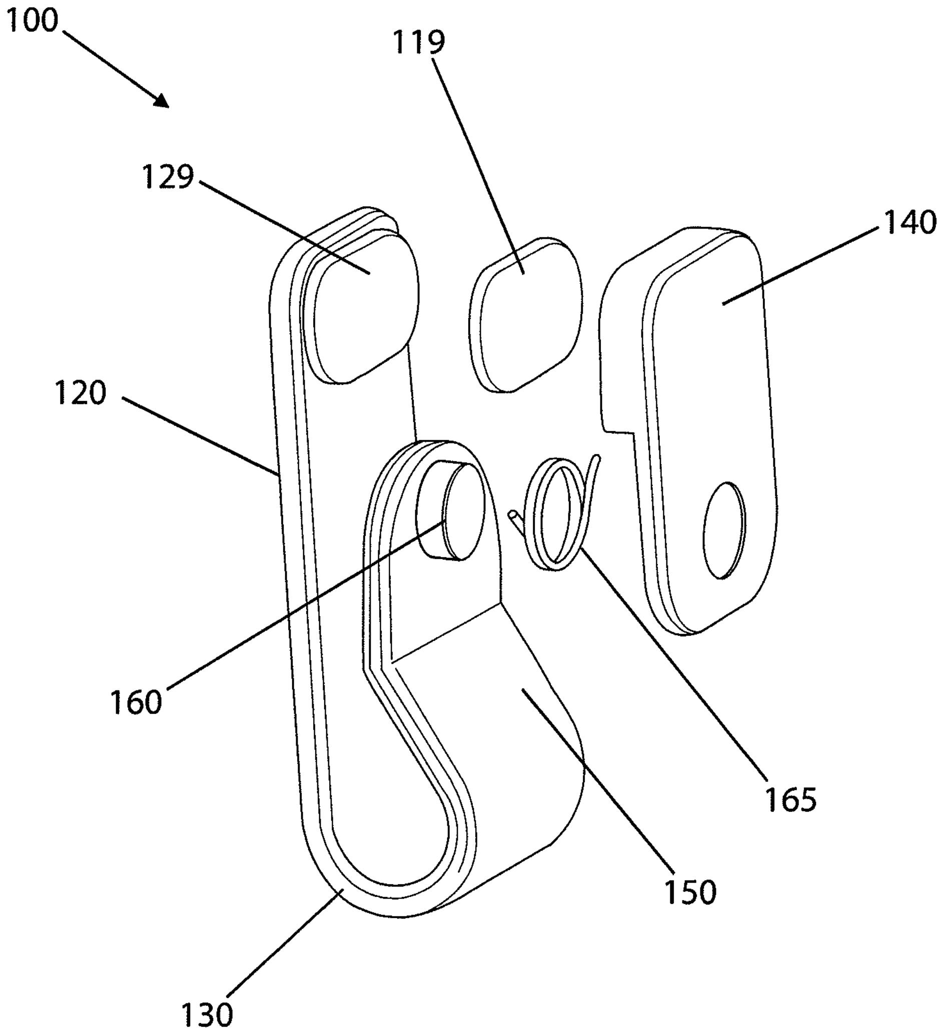
FIG. 4 depicts an exploded view of a material separating tool including a pivot point and a biasing element according to an example embodiment of the invention.

FIG. 4 illustrates an exploded view of the tool 100 of FIGS. 1-3. The exploded view illustrates the first portion 140 of the first arm 110 detached from the second portion 150 at the pivot point 160. The pivot point 160 may include a biasing member, such as a torsion spring 165 to bias the first portion 140 of the first arm 110 into alignment with the second portion 150, in the position illustrated in FIG. 1. Upon pivoting the first portion 140 relative to the second portion 150, to the position shown in FIG. 3, and releasing the first portion 140, the first portion 140 will return to the position illustrated in FIG. 1.

The pivot point 160 of the illustrated embodiment of FIGS. 1-4 is configured to allow movement between the material contact pads 119, 129, to a position in which the material contact pads are no longer aligned. While the illustrated embodiment includes a pivot point 160, embodiments of the present invention may include a flexible hinge 130 that permits motion both along axis 180 illustrated in FIG. 2 and movement between the first arm 110 and the second arm 120 along arrow 190 of FIG. 3. In such an embodiment, the pivot point 160 may not be necessary.

Example embodiments of material separating tools, such as the embodiment illustrated in FIGS. 1-4, may be used to separate layers of materials. Materials such as sheets of paper and layers of thin plastics may be difficult to separate. Paper materials, such as pages of a magazine or book, or sheets of paper from a ream of paper, may be difficult to separate and may cause paper-cuts when a user tries to separate the layers proximate the edges. Plastic materials, such as thin film plastic produce bags, wicketed bags, or any articles in which layers of plastic are difficult to separate may be used with embodiments of the present invention.

Figure 5:
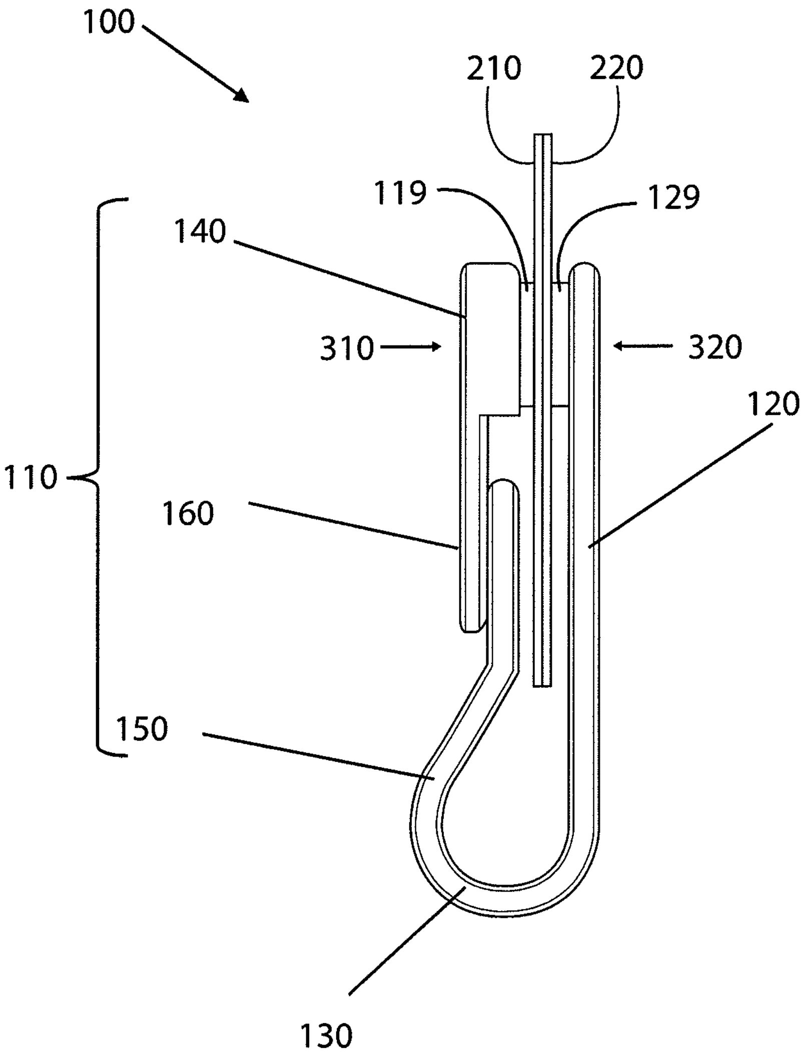
FIG. 5 illustrates a side view of a material separating tool engaging two layers of material according to an example embodiment of the invention.

FIG. 5 illustrates an example embodiment of a tool configured to separate layers of materials. In the illustrated embodiment, at least two layers of material are received within a gap defined between the first material contact pad 119 and the second material contact pad 129. The first layer of material 210 and the second layer of material 220 may be of any material type and may be similar or dissimilar materials. Upon receiving the two material layers 210, 220, a user may press the first arm 110 and the second arm 120 toward one another, along arrows 310 and 320, thereby capturing the two material layers between the first material contact pad 119 and the second material contact pad 129.

Figure 6:
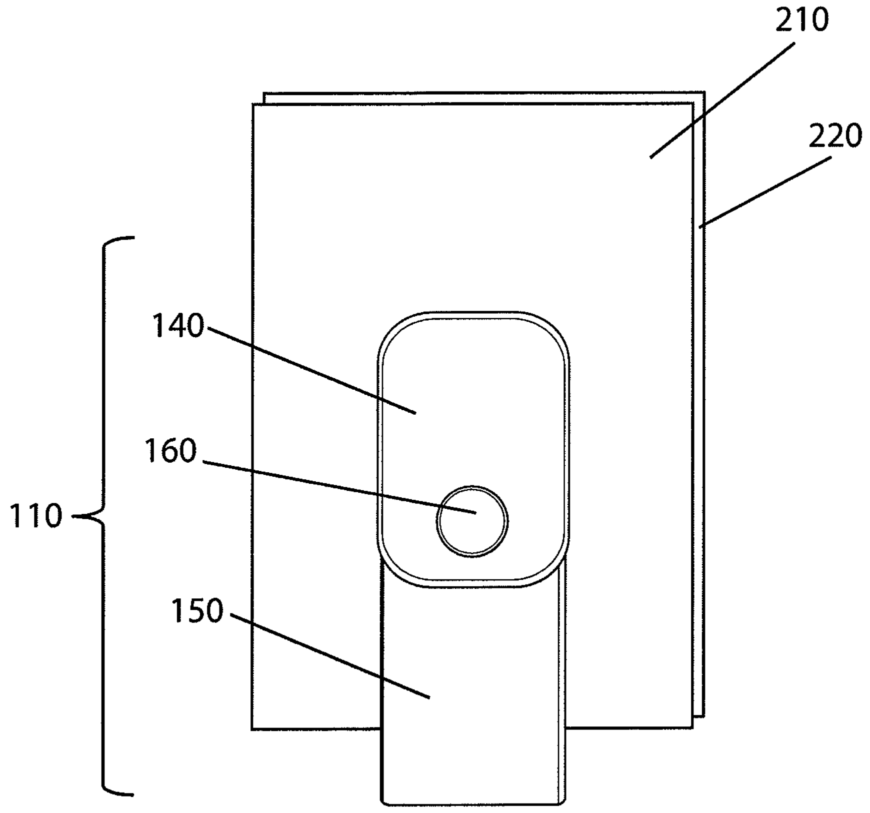
FIG. 6 illustrates a front view of the material separating tool of FIG. 5 engaging two layers of material.
Figure 7:
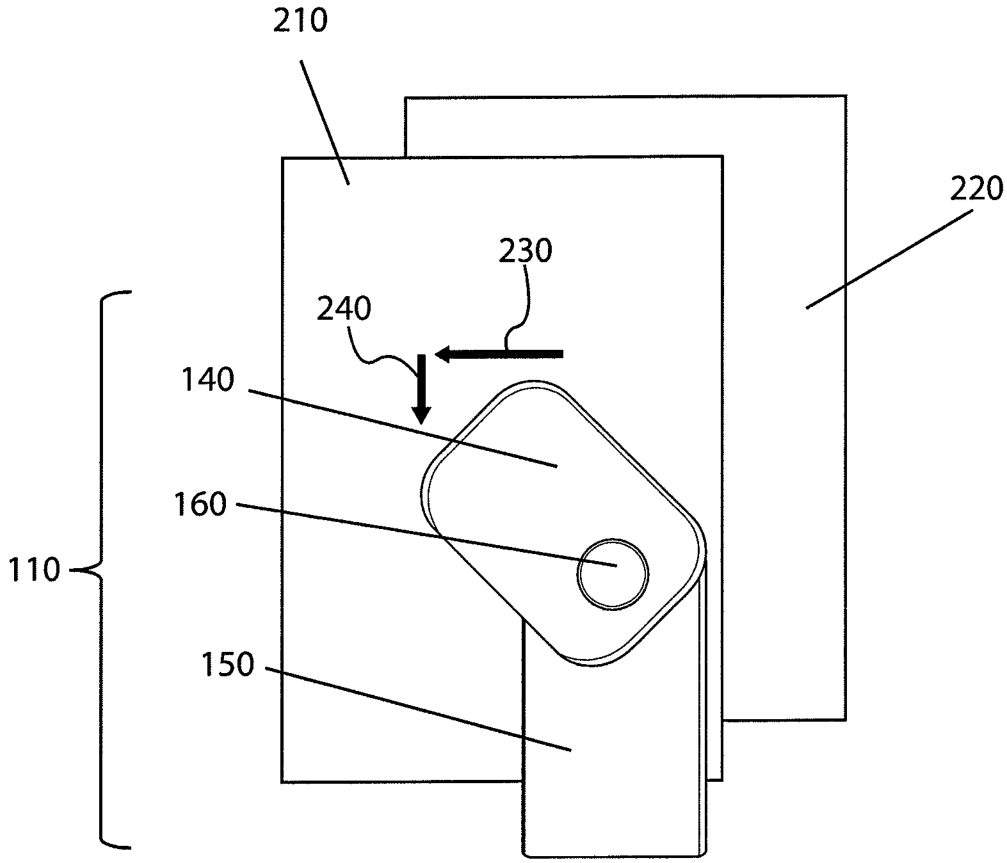
FIG. 7 illustrates two layers of material as separated by the material separating tool of FIGS. 5 and 6.

FIG. 6 illustrates another view of the two material layers 210, 220 captured between the material contact pads 119, 129 of the first arm 110 and the second arm 120. Upon capturing the material layers 210, 220 between the material contact pads 119, 129, the material layers are ready to be separated. A user may then pivot the first portion 140 of the first arm 110 relative to the second portion 150 of the first arm 110. Pivoting the first portion 140 of the first arm 110 moves the material contact pad of the first arm relative to the material contact pad of the second arm. As the material contact surfaces of the material contact pads, which are in contact with a respective layer of material, are relatively high friction, the movement between the material contact pads causes movement between the layers of material. FIG. 7 illustrates the layers of material 210, 220 moved relative to one another in response to the first portion 140 of the first arm 110 being pivoted.

As the first material contact pad moves in an arc relative to the second material contact pad, about the pivot point 160, the material layer 210 that is gripped by the material contact pad of the first arm 110 moves in an arc, creating movement along two axes (arrows 230, 240) relative to the first layer of material, thus providing separation between the layers of material.

The friction created between the first material layer 210 and the first material contact pad 119, and the friction created between the second material layer 220 and the second material contact pad 129, in response to the user pressing the material contact pads together as shown in FIG. 5, is greater than the friction between the first material layer 210 and the second material layer 220. Thus, as the first portion 140 of the first arm 110 is pivoted about pivot point 160, the first material layer 210 moves with the material contact pad 119 of the first arm 110 and the second material layer 220 remains stationary with respect to the second material contact pad 129. As the material layers 210, 220 are moved relative to one another, the static cling force between the layers is overcome and the amount of interfacing surface area may be reduced, thereby making further separation of the material layers by hand easier. In addition, as the material layers are moved along both directions 230 and 240 relative to one another, a single layer of material 210 is presented 215 for a user to grasp and to further separate the layers of materials.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A tool for separating material layers comprising:

a first arm comprising a first end and a second end;

a second arm comprising a first end and a second end;

a first material contact pad carried by the first arm proximate the first end of the first arm; and a second material contact pad carried by the second arm proximate the first end of the second arm;

wherein the second end of the first arm is joined to the second end of the second arm, and wherein the first arm and the second arm are movable with respect to one another along two substantially orthogonal axes.

2. The tool according to claim 1, wherein the first end of the first arm and the first end of the second arm define a gap there between, and wherein the first material contact pad and the second material contact pad are disposed within the gap.

3. The tool according to claim 2, wherein the first material contact pad and the second material contact pad comprise a material that is of a different composition than a material of the first arm or the second arm.

4. The tool according to claim 3, wherein the material of the material contact pad comprises rubber.

5. The tool according to claim 1 wherein the first arm comprises a pivot connection disposed between the first end and the second end.

6. The tool according to claim 5, wherein the first material contact pad defines a material contact surface, wherein the material contact surface defines a material contact plane, and wherein the pivot connection is configured to permit rotation of the first material contact pad relative to the second material contact pad within the material contact plane.

7. The tool according to claim 5, wherein the pivot connection comprises a biasing element configured to bias the first end of the first arm to a position in which the first material contact pad is facing the second material contact pad.

8. The tool according to claim 7, wherein the first arm and the second arm are joined proximate their respective second ends by a flexible portion.

9. The tool according to claim 1, wherein the first material contact pad defines a material contact surface, wherein the material contact surface defines a material contact plane, wherein a first of the two substantially orthogonal axes is perpendicular to the material contact plane, and wherein a second of the two substantially orthogonal axes is parallel to the material contact plane.

10. The tool according to claim 9, wherein the first material contact pad and the second material contact pad are configured to face one another, and wherein motion between the first material contact pad and the second material contact pad is limited such that at least a portion of the first material contact pad overlies a portion of the second material contact pad at all times.

11. A tool for separating material layers comprising:

a first arm comprising a first material contact surface defining a first material contact plane, wherein a first axis is defined orthogonal to the first material contact plane, and a second axis is defined parallel to the first material contact plane; and a second arm comprising a second material contact surface defining a second material contact plane, wherein the first material contact surface faces the second material contact surface, and wherein the first material contact surface and the second material contact surface are separated by a gap;

wherein the first arm is connected to the second arm and wherein the connection between the first arm and the second arm permits motion between the first arm and the second arm along both the first and second axes.

12. The tool according to claim 11, wherein the first material contact surface and the second material contact surface comprise rubber.

13. The tool according to claim 11, wherein the connection between the first arm, and the second arm, comprises a flexible portion connecting the first arm and the second arm.

14. The tool according to claim 13, wherein the flexible portion allows the first material contact surface to move relative to the second material contact surface along the first axis.

15. The tool according to claim 14, wherein the first arm comprises a pivot connection between the flexible portion and the first material contact surface, wherein the pivot connection allows the first material contact surface to move relative to the second material contact surface along the second axis.

16. The tool according to claim 15, wherein the pivot connection comprises a biasing member configured to bias the first material contact surface into alignment with the second material contact surface.

* * * * *